United States Patent
Wilson, III

(10) Patent No.: US 7,767,749 B2
(45) Date of Patent: Aug. 3, 2010

(54) RUBBER COMPOSITIONS WITH ACTIVATED SULFUR CURE

(75) Inventor: Thomas W Wilson, III, Taichung (TW)

(73) Assignee: Nike, Inc., Beaverton, OR (US)

( * ) Notice: Subject to any disclaimer, the term of this patent is extended or adjusted under 35 U.S.C. 154(b) by 18 days.

(21) Appl. No.: 12/509,967

(22) Filed: Jul. 27, 2009

(65) Prior Publication Data

US 2009/0286920 A1 Nov. 19, 2009

Related U.S. Application Data

(62) Division of application No. 11/776,654, filed on Jul. 12, 2007.

(60) Provisional application No. 60/830,824, filed on Jul. 14, 2006.

(51) Int. Cl.
  *C08L 9/02* (2006.01)
  *C08L 3/36* (2006.01)
(52) U.S. Cl. ...................... 524/525; 524/570
(58) Field of Classification Search ................. 524/525, 524/570
  See application file for complete search history.

(56) References Cited

U.S. PATENT DOCUMENTS

| 4,607,074 | A | 8/1986 | Hazelton et al. |
| 4,639,487 | A | 1/1987 | Hazelton et al. |
| 5,674,932 | A | 10/1997 | Agostini et al. |
| 6,384,117 | B1 | 5/2002 | Hergenrother et al. |
| 6,620,871 | B2 | 9/2003 | Wilson, III |
| 6,790,889 | B2 | 9/2004 | Hergenrother et al. |
| 6,984,450 | B2 * | 1/2006 | Menting et al. ........ 428/402.21 |

FOREIGN PATENT DOCUMENTS

| JP | 48052679 | 11/1971 |
| JP | 48052678 | 7/1973 |
| WO | WO 2005/060472 | * 7/2005 |
| WO | WO 2005/060472 A2 | 7/2005 |

OTHER PUBLICATIONS

Heideman, Geert et al., "Various routes for reduction of zinc oxide levels in rubber compounds", Tire Technology International 2004, pp. 22-27.

* cited by examiner

*Primary Examiner*—Robert D. Harlan
(74) *Attorney, Agent, or Firm*—Harness, Dickey & Pierce PLC

(57) ABSTRACT

Cured rubber compositions with reduced divalent metal levels and improved physical properties are prepared using methods that limit or avoid a deleterious side reaction, and that make activator compounds available only during cure and not earlier during mixing. Specifically, the presence of activator soap (or of components that can form the activator soap in situ) and silica filler together is avoided or minimized in process steps where the temperature would tend to be above 100° C. or 110° C. The use of ZnO for example can be reduced by as much as 90~95% in a typical rubber compound.

22 Claims, 1 Drawing Sheet

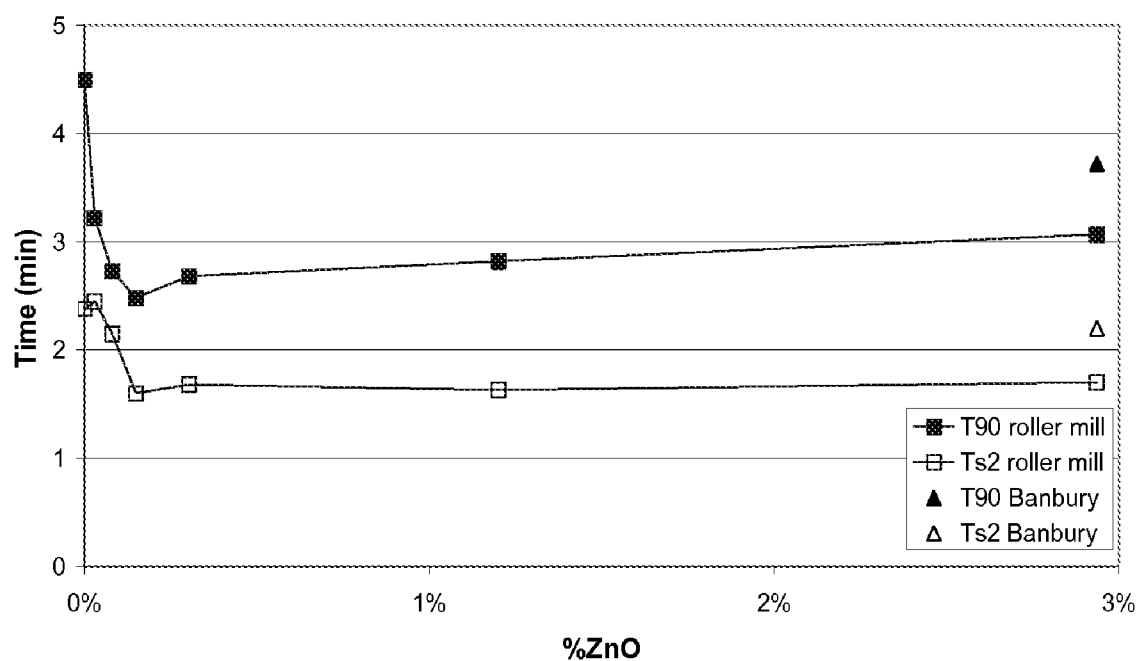

US 7,767,749 B2

RUBBER COMPOSITIONS WITH ACTIVATED SULFUR CURE

CROSS REFERENCE TO RELATED APPLICATIONS

This application is a divisional of U.S. patent application Ser. No. 11/776,654 filed on Jul. 12, 2007, which claims the benefit of U.S. provisional application 60/830,824 filed on Jul. 14, 2006, the disclosures of which are incorporated by reference.

INTRODUCTION

Zinc oxide (ZnO), as well as other divalent metal oxides such as CaO and MgO is commonly referred to as an activator for the cure of rubber compounds containing accelerators, especially those containing sulfur. More precisely, one molecule of cationic component (e.g. ZnO) combines with two molecules of a fatty acid such as stearic acid ($C_{17}H_{35}COOH$) to form a salt or soap such as zinc stearate ($Zn(C_{17}H_{35}COO)_2$) and water. The soap (e.g., the zinc stearate) is believed to be the activator for cure.

During mixing and/or cure, the ZnO (or other cationic component) and fatty acid react to form the soap, which activates the sulfur cure. In actual practice, a stoichiometric excess of the cationic component to fatty acid is employed in the rubber compounds to obtain sufficient activation.

The excess of cationic component such as ZnO in the cured rubber tends to weaken the physical properties of the cured rubber. Additionally, zinc tends to leach out of cured rubber compositions over time, which could lead to concerns over contamination since zinc oxide is considered to be an ecotoxin.

In light of the situation, it would be desirable to provide methods and compositions for curing rubber that have low levels of zinc, yet which still give acceptable cure kinetics and physical properties in the resulting cured articles.

SUMMARY

Cured rubber compositions with reduced divalent metal levels and improved physical properties are prepared using methods that limit or avoid a deleterious side reaction, and that make activator compounds available only during cure and not earlier during mixing.

It has been found that zinc soaps participate in a side reaction on the surface of silica filler commonly used in rubber compounds that depletes the available zinc (as ZnO), regenerates the stearic acid that further consumes ZnO, and lowers the physical properties of the resultant cured rubber compound. Although the side reaction is most prominently observed with zinc activator components, the issue can also arise when analogous calcium or magnesium activation is used.

According to various embodiments, the side reaction is eliminated or suppressed by changing the order of addition of ingredients and precise process control. Thus, in one aspect, the invention is based on exploitation of the situation that the activator components such as ZnO, Zn soap, and/or fatty acid need be present, in a chemically active sense, only during the cure, and are not needed, as activators, during the mixing. Specifically, the presence of activator soap (or of components that can form the activator soap in situ) and silica filler together is avoided or minimized in process steps where the temperature would tend to be above 100° C. or 110° C.; the methods also result in less time of contact between the activator soap and the filler even at lower temperatures prior to cure. The use of ZnO for example can be reduced by as much as 90~95% in a typical rubber compound.

In other embodiments, control of the process and physical properties of the resulting cured rubber is achieved by microencapsulation of activator components such as ZnO, Zn stearate and/or stearic acid. The microcapsules are stable to temperatures up to 120° C. up to 130° C., up to 140° C., or up to 150° C., allowing a microencapsulated component to be present with the silica filler at those temperatures with reduced chance of participating in the undesired side reactions. Then, upon cure at higher temperatures (above those at which the microcapsules are stable), the microcapsules release the activator component and cure is activated. Advantageously, control of the side reactions allows lower than conventional levels of zinc to be used. In an exemplary embodiment, ZnO and fatty acid are used at approximately a stoichiometric level (one mole of ZnO to two moles of fatty acid), which is a significantly lower level of zinc than is conventionally used.

More details and embodiments of the invention will be described below.

BRIEF DESCRIPTION OF THE DRAWINGS

FIG. 1 shows cure parameters for illustrative rubber compositions.

DESCRIPTION

In one embodiment, the invention provides a method of curing a rubber composition by activating a sulfur cure with a rubber soluble salt or soap. The method involves a first mixing wherein uncured rubber, filler and optionally other rubber additives are combined. The first mixing does not include components of the sulfur curing system and excludes the salt itself and at least the cation component of the rubber soluble salt. The first mixing is carried out at temperatures up to about 190° C., preferably between 100° C. and 180° C. and more preferably between 110° C. and 140° C. In a second mixing, the sulfur curing components are added at a lower temperature, along with any salt or salt component left out of the first mixing. Typically, the temperature of the second mixing does not exceed 110° C. and is preferably 100° C. or less. After the second mixing, the rubber composition is cured by heating at a temperature of 130° C. or higher, preferably 150° C. or higher. When the cure is activated by use of a zinc fatty acid salt, the salt components comprise one or more of a cationic zinc compound (the cation component of the salt, which is normally the oxide ZnO) and an organic fatty acid, such as carboxylic acids of 8 to 26 carbon atoms, while the salt itself is a zinc salt or soap of such a fatty acid.

The salt or the cationic salt component is added in a separate step as noted above. For the reasons discussed herein, the new method of compounding permits the use of lower levels of cation to provide activation of the cure. Again in an illustrative embodiment, when the cation is zinc, the rubber composition (after the second mixing and before cure) advantageously contains 2 phr or less of fatty acid and 2 phr or less of zinc compound. Alternatively, the rubber composition contains 2 phr or less of the zinc fatty acid salt.

When it is said the first mixing excludes the salt itself or at least the cationic component of the rubber soluble salt, it means that the first mixing contains no cationic component at a level that would react with the filler to contaminate the filler and deplete the cation required for cure activation. In some recipes, the activator component is a cationic fatty acid salt, also called a soap. Examples of salts include those of zinc, calcium, and magnesium. In other recipes, the activator is formed in situ during mixing or curing from a cationic component and an anionic component of the salt provided as separate additives to the rubber composition. Typically, the anionic component is a fatty acid, while the cationic component is an oxide or other compound of the cation. Illustrative cationic components include ZnO, CaO, and MgO. Thus, to further illustrate, the first mixing contains no zinc, calcium, or magnesium salt of a fatty acid, and further contains no ZnO, CaO, or MgO. The first mixing excludes at least the cationic component, and can exclude the anionic component (i.e. the fatty acid) as well. However, the first mixing can contain (i.e. not exclude) the anionic component of the activator soap, as according to the present teachings the fatty acid does not react with the filler in a deleterious way.

In compositions and methods of the invention, a preferred filler is silica and a preferred cationic component is ZnO. Further non-limiting description of the invention is given with respect to these additives.

In exemplary embodiments, the first mixing is carried out in a barrel type shear mixer such as a Banbury, while the second mixing is carried out on a roller mill. In various embodiments, zinc oxide is left out of the first mixing and added for the first time during the second mixing along with before, or following addition of the curative package. During the first mixing, at least the cation component of the rubber soluble salt is omitted. Advantageously, less than 2 phr zinc oxide is added in the second mixing. For example, in various embodiments, the level of zinc oxide is from 0.1 to 1 phr. Low levels of fatty acid are also added. In a non-limiting embodiment, 0.05 to 0.5 phr zinc oxide and 0.1 to 1.5 phr fatty acid are added.

In preferred embodiments, the filler comprises a silica filler in an amount such as 10 to 100 phr. In further non-limiting embodiments, the compounds comprise 30 to 60 phr silica filler or 40 to 60 phr silica filler.

In a preferred embodiment, zinc oxide and fatty acid are added to the rubber compound in a stoichiometric ratio of approximately 1 mole zinc oxide to 2 moles of fatty acid. In further preferred embodiments, the zinc oxide is microencapsulated in a wall material that withstands the temperature of mixing but that dissolves or ruptures at the temperature of the subsequent cure. In various embodiments, the zinc oxide is provided as particles having a diameter in the micrometer range. In other embodiments, zinc oxide comprises at least some particles of at least 100 nm or less. In a commercial embodiment, the zinc oxide comprises having an average diameter of 75 nm.

In another embodiment, the invention provides methods of producing cured rubber compositions using a protected activator composition for the curing agent. As before, the cure mechanism of the rubber compositions involves activation of the sulfur cure with the zinc salt of a fatty acid or zinc soap. Alternatively, calcium or magnesium salts are used to activate the cure. Combining uncured rubber, filler, and other rubber additives exclusive of the sulfur cure package in a first mixing step is carried out at a temperature of about 150° C. or less, for example in a Banbury mixer. In a second mixing, such as in a roller mill, the sulfur curative is added to the product of the first mixing, preferably at a temperature of 110° C. or less. As an example of a protected activator composition, microencapsulated zinc oxide and/or microencapsulated zinc fatty acid salt is added to either the first mixing, the second mixing, or to both. In a preferred embodiment, when the temperature of the first mixing is above 130° C., the protected activator or microencapsulated Zn, Ca, or Mg compound is added only in the second mixing. The microencapsulated zinc compounds comprise the respective zinc compounds (zinc oxide and zinc fatty salt or soap) and a wall material surrounding the zinc compound. The wall material is stable to a temperature sufficiently high that it does not release the zinc compound during the first or second mixing. In this way, zinc is prevented from coming into contact with the silica filler until the rubber composition is cured at a higher temperature. The method further comprises curing the resulting rubber composition by heating at a temperature above 120° C. or above 130° C., and preferably at 150° C. and above. Upon curing, the zinc compound (or calcium or magnesium if used) is released from the microcapsules. If zinc oxide is microencapsulated, upon release it combines with the fatty acid to produce a zinc soap that activates the sulfur cure of the rubber composition. Advantageously, the rubber composition contains 2 phr or less of zinc oxide or zinc fatty acid salt. In preferred embodiments, the compounds contain less than 1 phr, preferably less than 0.5 phr or less than 0.3 phr of zinc oxide or zinc soap.

In various embodiments, the rubber compounds contain less than 2 phr zinc oxide along with sufficient fatty acid to form a level of soap sufficient to give suitable cure kinetics. In preferred embodiments, the rubber compositions comprise 10 to 100, 30 to 60 phr, or 40 to 50 phr silica filler. In various embodiments, the wall materials are selected from waxes, paraffins, polyethylene, ethylene vinyl acetate copolymers, and polyvinyl alcohols.

Rubber formulations are usually expressed as parts per hundred parts of rubber (phr). To illustrate, a typical rubber formula may contain 100 parts of rubber, 45 phr filler, 5 phr ZnO, 1 phr stearic acid, 2 phr sulfur, and various other ingredients such as accelerators, retarders, process oil, antioxidants, and so forth. In such a formula, the weight percent of a component such as ZnO is calculated as a fraction or percent of the total weight of the whole.

The rubber compositions of the invention contain natural or synthetic rubber, or mixtures of rubbers, as well as conventional rubber additives such as curing agents and accelerators. In various embodiments, the compositions of the invention are moldable rubber compositions containing a rubber resin, a curing agent composition, a filler, and a protected activator composition for the curing agent. In particular embodiments, the protected activator composition comprises microencapsulated metal oxide or a microencapsulated metal soap or salt of a fatty acid. The metals are selected from those of group IIA and IIB of the periodic table, but are preferably zinc, calcium, or magnesium, especially as the oxides ZnO, CaO, and MgO. A preferred metal for the activator composition is zinc.

In general, any rubber that can be crosslinked by a sulfur cure may be used to make the compositions of the invention. Sulfur cured describes the vulcanization process typical of making rubber. Mixtures of rubbers may also be used. Examples of rubbers useful in the invention include, without limitation, natural rubber and modified natural rubbers such as those based on polyisoprene.

Synthetic rubbers may also be used in the invention. Examples include, without limitation, synthetic polyisoprenes, polybutadienes, acrylonitrile butadiene rubber, styrene acrylonitrile butadiene rubber, polychloroprene rubber, styrene-butadiene copolymer rubber, isoprene-isobutylene copolymer rubber and its halogenated derivatives, ethylene-propylene-diene copolymer rubbers such as ethylene-propylene-cyclopentadiene terpolymer, ethylene-propylene-5-ethylidene-norbornene terpolymer, and ethylene-propylene-1,4-hexadiene terpolymer, butadiene-propylene copolymer rubber, butadiene-ethylene copolymer rubber, butadiene-isoprene copolymer, polypentenamer and their mixtures. In general, such compounds are characterized by repeating olefinic unsaturation in the backbone of the polymer, which generally arises from the presence of butadiene or isoprene monomers in the polymer structure.

Conventional sulfur based curing agents may be used in the compositions of the invention. Such curing agents are well known in the art and include elemental sulfur, soluble, insoluble and mixtures thereof, as well as a variety of organic sulfide, disulfide and polysulfide compounds. Examples include, without limitation, vulcanizing agents such as morpholine disulfide, 2-(4'-morpholinodithio)benzothiazole, and thiuram compounds such as tetramethylthiuram disulfide, tetraethylthiuram disulfide and dipentamethylenethiuram tetrasulfide. The vulcanizing agents may be used alone or in combination with each other. In a preferred embodiment, sulfur is used as the curing agent.

The rubber compositions of the invention also in general, contain conventional accelerators. Such accelerators and co-accelerators are known in the art and include without limitation, those based on dithiocarbamate, thiazole, amines, guanidines, xanthates, thioureas, thiurams, dithiophosphates, and sulfenamides. Non-limiting examples of accelerators include: zinc diisobutyldithiocarbamate, zinc salt of 2-mercaptobenzothiazole, hexamethylenetetramine, 1,3-diphenyl guanidine, zinc isopropyl xanthate, trimethyl thiourea, tetrabenzyl thiuram disulfide, zinc-O——, O-di-n-butylphosphorodithioate, and N-t-butyl-2-benzothiazylsulfenamide.

In various embodiments, the accelerator activators comprise metal complexes of fatty acids, which are referred to as "soaps". Zinc soaps include the soap, or salt, of a fatty acid such as one having from 8 to 36 carbon atoms or 8 to 26 carbon atoms. In a non-limiting embodiment, the fatty acids have 10-24 carbon atoms. Non-limiting examples include lauric acid, oleic acid, and stearic acid. The fatty acids form a soap with zinc by combining two moles of fatty acid with one mole of zinc.

For activation, zinc soaps can be added directly to a rubber composition and can be encapsulated according to the methods described herein. Alternatively or in addition, individual compounds such as ZnO and a fatty acid can be blended into the curable rubber compositions. During high temperature treatment such as in curing, the individual compounds react to form the soap in place. In either case, the soap is believed to be the active species. The terms soap components, activator components, salt components, and the like are used herein, unless the context dictates otherwise, to refer to any of ZnO or other zinc salt, to the zinc soap itself, and to the fatty acid component. Adding soap components then means adding any of those components to the rubber composition during compounding.

In various embodiments, the invention provides methods and compositions that avoid contact of zinc, as the zinc soap, with silica filler prior to high temperature cure. The deleterious side reaction of zinc with silica filler is avoided as long as no or very little zinc component is present along with the filler, or alternatively if any zinc component present is prevented from interacting with the surface by virtue of its being encapsulated. If one of the three ingredients, ZnO, Zn stearate or stearic acid (the latter two as non-limiting examples of soap and fatty acid), is encapsulated, then the Zn is preserved and is available during cure. In preferred embodiments, the ZnO or Zn stearate is encapsulated. Stearic acid may be encapsulated, but since other adjunct chemicals may introduce traces of stearic acid as dispersants, it is preferable to encapsulate the ZnO or Zn stearate.

Advantageously, because the methods provide for preservation of zinc (i.e., the zinc remains available to activate the cure accelerators instead of being bound and decomposed on the silica filler surface), relatively lower amounts of zinc need to be added to the rubber compounds to provide a suitable or acceptable cure. To illustrate, in cases where typically 5 phr of ZnO would be used along with about 1 phr of fatty acid, the level of ZnO can be reduced below 2 phr and even below 1 phr without adversely affecting cured rubber properties. In fact, physical properties appear to be enhanced. Although the invention is not limited by theory, the enhancement is believed to be due to lower contamination of the filler surface with zinc, and a lowered quantity of the relatively large (compared to the other additives and fillers) particles of ZnO in the rubber compositions that act as points of stress concentration, which can lead to cracks and failure in the bulk materials In preferred embodiments, the preserved zinc is present in the rubber compositions at a level of 1 mole of zinc for two moles of fatty acid. This ratio is referred to as "stoichiometric" because it corresponds to formation of a soap with the fatty acid and the divalent zinc. Stoichiometric zinc to 1 phr fatty acid is typically below 0.5 phr. Thus in various embodiments the invention provides for a greater than 90% reduction of the zinc level (i.e. from a typical level of 5 phr down to 0.5 phr or less). In a representative embodiment, activation is provided by about 0.3 phr ZnO and 1 phr fatty acid, corresponding to about a stoichiometric ratio. Once the amount of Zn relative to the acid species is less than stoichiometric, then activation of the cure is inhibited, because the active species (zinc salt) is present in even lower levels.

Fillers are used in rubber compositions to enhance properties, to save money, to facilitate processing, to improve physical properties or for other reasons. A variety of filler materials are known. In various embodiments, the compositions comprise a silica filler. Typical levels of silica filler include from about 10 phr to 100 phr or higher. In various embodiments, the compositions contain 10-80, 30-70, 40-60, 50-60, or 35-60 phr filler.

Zinc oxide suitable for rubber compounding is available in a variety of particle sizes. For example, nanoparticle ZnO (75% masterbatch) can be purchased from Cosmos Chemical and is reported to have a particle size of 75 nm. A standard ZnO (80% masterbatch) from Atman is reported to have a particle size of 50 μm. Zinc oxide powder, of any dispersible particle size, as opposed to a masterbatch, can also be used.

Methods of the invention call for addition of various components in a first mixing and in a second mixing. The mixing refers to operational steps and may or may not entail transfer of the mixing compound from one vessel to another. For example, a first mixing may take place in a mixer such as a Banbury, while the second mixing takes place in a roller mill after removal from the Banbury. Alternatively, a first mixing and a second mixing may take place in the same mixing vessel or device. An example would be combining a subset of the total compounding ingredients in a device such a roller mill and adding components sequentially in first and subsequent mixings.

The designation of "first" and "second" mixings also does not necessarily imply that the steps so designated take place in immediate succession one after the other. Rather, the terminology allows for there to be intermediate steps where for example, other components are added.

In various embodiments, the first mixing (where in one embodiment zinc components are not included and in another embodiment zinc components are included only if they are microencapsulated) is carried out at a relatively high temperature of about 130-150° C. These temperatures are typical of barrel type shear mixers such a Banbury mixer. In a Banbury or similar mixer, rubbers and other components (normally excluding the cure components) are mixed with shear. The shearing generates heat, and heat can be added to facilitate mixing. The filler such as silica is normally added at this stage.

The second mixing, in which low levels of zinc can be added along with the cure package, preferably takes places at a lower temperature, preferably below about 110° C., in part to avoid a premature curing. In various embodiments, the temperature is 100° C. or less. In a non-limiting example, the second mixing takes place in a roller mill. The temperature of the material in the roller can be controlled by cooling the rollers, and is typically below the higher temperatures that occur in the Banbury mixer.

Other combinations of mixing devices are well known to those of skill in the art and are suitable for carrying out the first and second mixing, as well as any other mixing steps required to formulate and cure the rubber compounds.

Methods of microencapsulation are varied and partly dependent on the material being encapsulated and the desired mode of releasing the encapsulated component. Since the desired result is to release the encapsulated component during the cure cycle, the microcapsule must possess certain properties. First, it must be able to withstand compounding at elevated temperatures such as on a roller mill or, if desired, a Banbury-type mixer. The microcapsules must possess sufficient strength to withstand the shear encountered in the milling without a significant number of them rupturing. Preferably, the microcapsules rupture at a temperature so that the zinc activator is available during cure. In various embodiments, the microcapsules rupture and release the encapsulated zinc at temperatures of 130±20° C., 130±10° C. or 125±5° C. The microcapsule material should not adversely affect the cure characteristics of the system nor cause any unacceptable reduction in the final properties of the cured rubber. In various embodiments, by microencapsulating the activator, the curing kinetics are somewhat slower. Such is not necessarily disadvantageous for manufacturing.

The wall material of the microcapsules is selected for good compatibility with the constituents of the rubber mixtures. Non-limiting examples include waxes, paraffins, polyethylene (PE), ethylene-vinyl acetate copolymers, polyvinyl alcohols (PVA), as well as mixtures of these. Other non-limiting examples include calcium caseinate, calcium polypectate, polyacrylic acid and derivatives, polycarbonates, polyethylene oxide, polymethacrylate ester, polyorthoester, polyvinyl acetate, polyvinylpyrrolidone and thermoplastic polymers.

In various embodiments, suitable coating materials also include polymerizable compositions. Non-limiting examples include liquid polyacrylate compositions that can contain a catalyst system consisting of photoinitiator and thermal initiator; polymerizable mixtures of dihydropyridine, tetrazole and a soluble ionic salt; polyurethanes; amorphous polyesters which optionally contain tertiary amine groups; mixtures of polyamino compositions and derivatives of 2,4,6-triamino-1,3,5-triazine with aldehydes; mixtures of polyethylene and polyvinyl alcohols; aminoplast resins; and silicone polymers.

In some preferred embodiments, suitable wall materials tend to melt in the temperature range which is important for rubber vulcanization, i.e. between roughly 100 and 260° C. They preferably melt below 150° C. and preferably have a melting point in the range from 120 to 140° C., in particular of roughly 130° C. Preferably, the coating materials are relatively insoluble in rubber or in rubber mixtures prior to melting, preferably up to temperatures of 120 to 140° C., in particular up to about 130° C. In various embodiments, the materials are soluble in rubber at higher temperatures, for example above 120 or 130° C.

In a non-limiting embodiment, microencapsulation is carried out by adding ZnO to a solution of polymeric wall material in an alcoholic solution of a Group I-IV metal halide or nitrate. To illustrate, 10 g of polyamide is dissolved in 190 g saturated calcium chloride solution in methanol. 10 g of ZnO is added to form a suspension. The suspension is added to one liter of a 1:1 MeOH:water mixture and stirred for about 15 minutes to give ZnO microcapsules.

In another embodiment, powdered ZnO is combined in about a 7:3 ratio with a polyethylene wax above its melting point then passed in the melted state to a rotary table and atomized in a cooling tower to provide microcapsules.

EXAMPLES

Example 1

As mentioned previously, the Zn is depleted in a side reaction. Zn stearate is able to react with the hydroxyl groups on the surface of a filler, such as precipitated silica. At the first stage of the reaction, one stearic acid molecule is generated. Provided there is more ZnO, another stearic acid molecule is liberated, and the Zn then binds to two surface oxygen atoms. The reaction scheme is more fully described below.

ZnO Consumption and Regeneration of Stearic Acid

Step 1. Zinc oxide reacts with 2 molecules of stearic acid to produce zinc stearate and water.

$$ZnO + 2C_{17}H_{35}COOH \leftrightarrow Zn(C_{17}H_{35}COO)_2 + H_2O$$

Step 2. Zinc stearate reacts with hydroxyl groups on the surface of the silica particle to regenerate one stearic acid molecule.

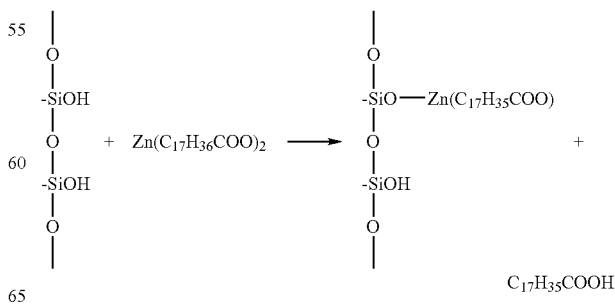

Step 3. Further reaction with the silica hydroxyls can regenerate the other stearic acid; thus contaminating the silica surface.

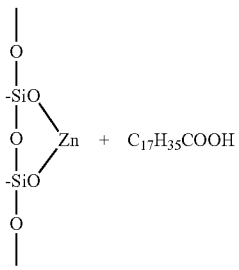

At large excesses of ZnO relative to stearic acid, the reaction progresses to Step 3. At a slight excess or stoichiometric deficit of stearic acid, the reaction stops at Step 2 when the ZnO is exhausted.

The cessation of the above reaction scheme upon depletion of ZnO (Zn stearate) has been shown via FTIR, where the species shown in the second part of reaction 2 is only resolved via FTIR as the concentration of ZnO, and consequently Zn stearate, approaches zero. This suggests that the reaction to deplete Zn and regenerate stearic acid (steps 2 and 3) is very fast.

Example 2

Since in conventional compounding ZnO and stearic acid are added in the initial mixing (Banbury) of the rubber components, they are present throughout the entire cycle from initial mixing to final cure. Furthermore, except for curing, the initial mixing is where the rubber compound encounters the highest temperatures, often>130° C.

By adding the activator components later in the process, for example in a second mixing during addition of sulfur and accelerators, the total amount of ZnO required for cure is reduced. Even without a reduction in ZnO, waiting until later in the process improves the physical properties of the cured rubber compound since the filler surface is less contaminated. Also, the cure accelerates as shown in FIG. 1.

As shown in FIG. 1, the cure time (T90) is reduced by 40 sec just by adding the ZnO on the roller mill (in a second mixing at 110° C. or less), instead of in the Banbury. Further reductions in ZnO concentration (i.e., down from 5 phr=2.9 weight %) also cause the cure to progress more quickly until the ZnO concentration approaches the stoichiometric ratio with stearic acid. As the ZnO level is further reduced below the stoichiometric point, the cure slows down due to insufficient activation of the accelerator.

Example 3

The following data show how changes in ZnO concentration can have a dramatic effect on physical properties. The greatest percent change was in the abrasion resistance (measured as cc of material lost), where a lower number is better.

In the compositions of Table 1, the following rubber additives are used:

| Abbreviation | Compound | phr |
|---|---|---|
| IR | Polyisoprene rubber | 10 |
| NBR50.75 | Acrylonitrile/butadiene rubber | 10 |
| UBE-BR150L | Polybutadiene rubber | 80 |
| 60NS | Homogenizing agent | 3 |
| 175GR | Filler (silica) | 50 |
| ZnO-80 | Zinc oxide, 80% | varies |
| ST/AC | Stearic acid | 1 |
| BHT | Butylated hydroxytoluene | 1 |
| 1956 | Okerin 1956 anti-blooming agent | 0.5 |
| PEG | Polyethylene glycol | 3 |
| RT1987 | Rhenofit 1987 | 2 |
| Curative Package | | |
| SU135-75 | Sulfur (crosslinker) | 2.4 |
| MBTS-75 | 2,2'-dithiobisbenzothiazole (accelerator) | 0.8 |
| TBTZD-70 | tetrabenzyl thiuramdisulfide (accelerator) | 0.26 |

For Example 3-1, all ingredients, except the curative package, are combined in the Banbury. For Examples 3-2 through 3-8, all ingredients except the curative package and the ZnO-80 are combined in a Banbury mixer at a temperature of 130° C. Then the components of the curative package and the ZnO are added in a roller mill at a temperature of about 70° C. Thereafter the compositions are cured at 150° C. for a total time of T90+1 minutes.

For the results in Table 1, hardness is Shore A, 300% modulus and tensile strength are in units of kg/cm$^2$, elongation is in percent, tear is in units of kg/cm, abrasion (Akron) is in cc lost/3000 revolutions and density is in g/cm$^3$.

TABLE 1

| | 3-1 | 3-2 | 3-3 | 3-4 | 3-5 | 3-6 | 3-7 | 3-8 |
|---|---|---|---|---|---|---|---|---|
| phr ZnO | 6.25 | 6.25 | 2.5 | 0.625 | 0.313 | 0.156 | 0.0625 | 0 |
| wt. % ZnO | 2.94 | 2.94 | 1.2 | 0.3 | 0.15 | 0.08 | 0.03 | 0 |
| hardness | 68.5 | 70.5 | 72.5 | 71.5 | 74 | 66 | 68.5 | 66 |
| 300% mod. | 48 | 55 | 57 | 54 | 52 | 29 | 37 | 21 |
| tensile | 137 | 138 | 137 | 145 | 178 | 125 | 119 | 90 |
| % elong. | 616 | 560 | 549 | 608 | 716 | 818 | 775 | 834 |
| tear | 52 | 58 | 60 | 64 | 71 | 80 | 78 | 58 |
| abrasion | 0.249 | 0.231 | 0.167 | 0.103 | 0.08 | 0.141 | 0.215 | 0.349 |
| density | 1.155 | 1.141 | 1.13 | 1.145 | 1.129 | 1.142 | 1.119 | 1.1 |

I claim:

1. A method of curing a rubber composition by activating a sulfur cure with a rubber soluble salt or soap provided in the composition as the salt itself or as an anionic component and a cationic component that react to form the salt in situ, the method comprising:
   combining uncured rubber, filler, and optionally other rubber additives exclusive of sulfur curing system and excluding the salt itself and at least the cation component of the salt in a first mixing step at temperatures up to 150° C.;
   adding sulfur curing components and the salt or any component omitted in the first mixing to the product of the first mixing step at a temperature not exceeding 110° C.; and
   subsequently curing the resulting rubber composition by heating at a temperature of approximately 130° C. or higher;
   wherein the resulting rubber composition comprises the anionic component at a level of 2 phr or less and the cationic component at a level of 2 phr or less, or the rubber composition comprises the salt itself at a level of 2 phr or less.

2. A method according to claim 1, wherein the first mixing is in a barrel type shear mixer.

3. A method according to claim 1, wherein the second mixing is on a roller mill.

4. A method according to claim 1, wherein the salt components comprise zinc oxide and $C_8$-$C_{26}$ fatty acid.

5. A method according to claim 4, wherein the product of first mixing contains no zinc oxide and no fatty acid.

6. A method according to claim 1, wherein the salt components comprise $C_8$-$C_{26}$ fatty acid and one or more of CaO and MgO.

7. A method according to claim 4, comprising adding less than or equal to 2 phr zinc oxide and less than 2 phr fatty acid in the second mixing step.

8. A method according to claim 7, comprising adding 0.1 to 1 phr zinc oxide.

9. A method according to claim 7, comprising adding 0.05 to 0.5 phr zinc oxide and 0.1 to 1.5 phr fatty acid.

10. A method according to claim 1, wherein the filler comprises 10 to 100 phr silica filler.

11. A method according to claim 10, wherein the product of the first mixing contains no zinc compound, and wherein at least one of zinc oxide and a zinc fatty acid salt is added in the second mixing.

12. A method according to claim 10, wherein the filler comprises 30 to 60 phr silica filler.

13. A method according to claim 4, comprising adding the zinc oxide and fatty acid in a stoichiometric ratio of approximately 1 mole zinc oxide to 2 moles fatty acid.

14. A method according to claim 1, wherein the zinc oxide is microencapsulated.

15. A method according to claim 1, wherein the zinc oxide comprises particles with a diameter of 50 μm or less.

16. A method of producing cured rubber compositions involving activation of sulfur cure with zinc salts of fatty acids, the method comprising:
   combining uncured rubber, filler, and optionally other rubber additives exclusive of a sulfur curative in a first mixing carried out at a temperature of about 150° C. or less;
   in a second mixing, adding a sulfur curative to the product of the first mixing step at a temperature of 110° C. or less;
   adding microencapsulated zinc oxide and/or microencapsulated zinc fatty acid salt to either the first mixing, the second mixing, or to both, provided that when the first mixing is at a temperature above 130° C., the microencapsulated components are added to the second mixing only, wherein the microencapsulated zinc oxide or zinc fatty acid salt comprises zinc oxide or zinc fatty acid salts and a wall material surrounding the zinc compound or respective fatty acid salt, the wall material stable to a temperature such that the microcapsules do not release the zinc compound during the first or second mixing; and
   curing the resulting rubber composition by heating to a temperature greater than or equal to 120° C., whereupon the zinc is released from the microcapsules and activates the cure, and
   wherein the rubber composition comprises 2 phr or less of zinc oxide or zinc fatty acid salt.

17. A method according to claim 16, wherein the resulting rubber composition comprises less than or equal to 1 phr of the zinc oxide or zinc fatty acid salt.

18. A method according to claim 16, wherein the resulting rubber composition comprises less than or equal to 0.3 phr of the zinc oxide or zinc fatty acid salt.

19. A method according to claim 16, wherein the resulting rubber composition comprises less than or equal to 1 phr zinc oxide and sufficient fatty acid to activate cure.

20. A method according to claim 16, wherein the resulting rubber composition comprises less than or equal to 0.3 phr zinc oxide and sufficient fatty acid to activate cure.

21. A method according to claim 16, wherein the resulting rubber composition comprises 10 to 100 phr silica filler.

22. A method according to claim 16, wherein the wall material comprises one or more members selected from the group consisting of waxes, paraffins, polyethylene, ethylene vinyl acetate copolymers, polyamides, polyacrylates, polymethacrylates, polycarbonates, polyethylene oxide, polyorthoester, polyvinyl acetate, polyvinylpyrrolidone, calcium caseinate, calcium polypectate, and polyvinyl alcohols.

* * * * *